United States Patent Office 3,366,592
Patented Jan. 30, 1968

3,366,592
POLYVINYL ALCOHOL PLASTICIZED WITH 2,2-DIETHYL-1,3-PROPANEDIOL
Robert H. Beeman, Kennett Square, Pa., assignor to E. I. du Pont de Nemours and Company, Wilmington, Del., a corporation of Delaware
No Drawing. Filed June 24, 1964, Ser. No. 377,479
2 Claims. (Cl. 260—33.4)

ABSTRACT OF THE DISCLOSURE

Compositions which are admixtures of polyvinyl alcohol and 5 to 30% 2,2-diethyl-1,3-propanediol, based upon the weight of the polyvinyl alcohol. The diethylpropanediol is a plasticizer for the polyvinyl alcohol and is particularly effective at elevated temperatures. The polyvinyl alcohol component is preferably a polyvinyl alcohol that is at least 97% hydrolyzed.

---

This invention relates to the plasticization of polyvinyl alcohol and to improved plasticized polyvinyl alcohol compositions.

Polyvinyl alcohols are derived by hydrolyzing polyvinyl acetates so as to replace all or part of the acetate groups of the latter with hydroxyl groups. The degree of replacement (or hydrolysis) will generally exceed 50%. Most commercial polyvinyl alcohols are 75–100% hydrolyzed and have viscosities of about 5 to 100 centipoises when measured as a 4% aqueous solution at 20° C. by the Hoeppler falling ball method.

Polyvinyl alcohols are unique among synthetic high polymers in having the following properties: water solubility, high tensile strength, impermeability to oxygen, nitrogen, carbon dioxide and other gases, and good release characteristics towards most other synthetic polymers. These properties are important commercially in the use of polyvinyl alcohol films in a variety of vacuum molding and vacuum forming operations wherein various structural resins and adhesives are cured at elevated temperatures while being held in place by a polyvinyl alcohol film under high vacuum. A deficiency of polyvinyl alcohol in such uses is its inherent brittleness. Under some conditions, polyvinyl alcohol films employed in such uses rupture because of their brittleness and thereby cause loss of vacuum.

Water is known to be an excellent plasticizer for polyvinyl alcohol but is difficultly retained in thin polyvinyl alcohol films at low relative humidities and/or high temperatures. Thus, in vacuum operations of the type referred to above, the assemblies including polyvinyl alcohol films are often held at temperatures up to 300° F. (149° C.) with resultant rapid loss of water leading to film embrittlement.

Various amides, aminoalcohols, glycols and polyol compounds and particularly glycerol have been proposed as plasticizers for polyvinyl alcohol. Such substances appear to function chiefly as humectants to increase the amount of water held in the film. They are quite satisfactory under mild conditions but at elevated temperatures, particularly under low humidity conditions, water, which is the actual plasticizer, is lost, and volatilization and/or degradation of the humectant may also occur with film embrittlement resulting.

Polyvinyl alcohol films prepared from the so-called partially hydrolyzed grades of polyvinyl alcohol in which from 75 to about 97% of the acetate groups of the parent polyvinyl acetates have been hydrolyzed are known to be somewhat more flexible than are films of the so-called completely hydrolyzed polyvinyl alcohols which are 97 to 100% hydrolyzed. The partially hydrolyzed grades also tend to be more compatible with a wider variety of polyols and other plasticizers. On the other hand, the partially hydrolyzed polyvinyl alcohols, a typical example of which is the commercial 88% hydrolyzed material which contains about 12% of the original acetate groups of the parent polyvinyl acetate, have lower tensile strength, higher permeability to gases and poorer release properties than do completely hydrolyzed grades, i.e., those which are at least 97% hydrolyzed or contain only about 3% or less of the original acetate groups. It is this latter type of polyvinyl alcohol which is especially useful in the above-mentioned vacuum molding and vacuum forming operations and with which the present invention is especially concerned.

It is an object of the invention to provide improved plasticized polyvinyl alcohol compositions. A particular object is to provide improved plasticized polyvinyl alcohol compositions which remain flexible after being heated at relatively high temperatures. Still further objects will be apparent from the following description.

The compositions of the invention are admixtures of polyvinyl alcohol and 2,2-diethyl-1,3-propanediol. The polyvinyl alcohol component of the composition may be any of the commercially available grades of polyvinyl alcohol but is preferably a fully hydrolyzed grade, i.e., one which is at least 97% hydrolyzed and has a viscosity of 5 to 100, most preferably 20 to 40, centipoises when measured as a 4% aqueous solution at 20° C. by the Hoeppler falling ball method.

The preferred compositions are especially useful in the form of films for holding in place various structural resins and adhesives during the curing thereof in vacuum molding and vacuum forming operations. They are also useful in the production of extruded polyvinyl alcohol articles and for various other purposes for which polyvinyl alcohols are employed.

The compositions of the invention contain from 5 to 30% of 2,2-diethyl-1,3-propanediol, based upon the weight of the polyvinyl alcohol. Smaller amounts are no doubt beneficial but are generally insufficient to give significant plasticization while larger amounts can be used although they result in no added advantage. The preferred amounts of the diethylpropanediol range from 15 to 25% of the weight of the polyvinyl alcohol.

The compositions of the invention may include ingredients other than polyvinyl alcohol and 2,2-diethyl-1,3-propanediol. Thus, they may include insolubilizing agents such as titanium lactate, melamine-formaldehyde and dimethylol urea; extenders such as starch, dextrin and caesin; dyes such as Congo red; gelling agents such as resorcinol and gallic acid; pigments such as $TiO_2$, $Fe_2O_3$ and lithopone; and other plasticizers such as the previously proposed plasticizers shown in Table 1 below. Such ingredients are well-known additives for polyvinyl alcohols and the use of any one or more thereof in the compositions of the invention is entirely optional. Whether or not one or more such conventional additive is used will depend mainly upon the properties desired in the polyvinyl alcohol composition and/or the final product made therefrom. Thus, in some instances the presence of an auxiliary plasticizer such as glycerol along with the 2,2-diethyl-1,3-propanediol may be advantageous.

In preparing the composition of the invention, the diethylpropanediol is mixed with the polyvinyl alcohol in any suitable manner. In one method, the diethylpropanediol is mixed in the desired amount with an aqueous solution of the polyvinyl alcohol, and the water is then evaporated from the resulting mixture, e.g., after casting as a film. If desired, the diethylpropanediol may be incorporated in the polyvinyl alcohol by milling the two together.

In the examples below, the plasticizer was added with good mixing to an aqueous solution of the polyvinyl alcohol and the resulting solution was spread on a glass plate with a doctor blade, air-dried over night and the resulting film peeled off. To test their thermal behavior, the films, about 2 mils thick, were cut into pieces about 4 inches square. These were placed in a circulating air oven and held for an hour or more at about 140° C. (284° F.). They were then removed from the oven and cooled rapidly (about 30 seconds) to room temperature, then grasped between thumb and forefinger on two opposite edges and rubbed vigorously back and fourth. Brittle films cracked or shattered almost immediately. Those made of the compositions of the invention survived numerous flexings, demonstrating their superior flexibility.

2,2-diethyl-1,3-propanediol is somewhat less compatible at ordinary temperatures with polyvinyl alcohol than are some materials previously proposed as plasticizers, as is indicated in the following examples. Also when the flexibilities of the various plasticized films shown were compared prior to baking, a number of the materials tested gave more flexible films than did 2,2-diethyl-1,3-propanediol. However, when the flexibilities of the films were tested after baking at 140° C., the films made according to the invention retained their flexibility, whereas all other films were brittle.

The explanation of this surprising superiority of the films plasticized with 2,2-diethyl-1,3-propanediol is not entirely understood. However, when films containing known amounts of polyvinyl alcohol and the various plasticizers were baked at 140° C. and the loss in weight with time determined, it was observed that films containing 2,2-diethyl-1,3-propanediol initially lost weight faster than did films containing like amounts of glycerol. After this initial period, however, the films containing glycerol lost weight substantially faster than did those containing 2,2-diethyl-1,3-propanediol. The results indicate that a lower diffusion rate through polyvinyl alcohol may be responsible for the better plasticizing performance of 2,2-diethyl-1,3-propanediol in the baked film.

The invention is illustrated by the following examples in which all composition percentages and parts are by weight.

Example 1

The polyvinyl alcohol used was a commercial completely hydrolyzed grade in which 99–100% of the acetate groups of the parent polyvinyl acetate had been hydrolyzed. It had a viscosity of about 30 centipoises, measured as a 4% aqueous solution at 20° C. by the Hoeppler falling ball method. A 10% solution thereof was prepared by adding one part of the polyvinyl alcohol to 9 parts of water and heating the resulting slurry to 90° C. with good agitation until a clear uniform solution was obtained. Water was added to make up for that lost by evaporation and the solution was cooled to room temperature. To each of fourteen 40.0 g. samples of this solution has added with stirring 0.8 g. of one of the plasticizers listed in Table 1. Each of the resulting solutions was cast on a level glass plate with a doctor blade set at a gate clearance of 40 mils. The resulting sample films were air-dried overnight then peeled from the plates and inspected. Test pieces of the films about 4 inches square were placed side-by-side in a circulated air oven regulated at a minimum temperature of 140° C. (284° F.). After an hour in the oven, the test pieces were removed and tested for flexibility by the flex test described above. The results are summarized in Table 1.

TABLE 1

| | Plasticizer | Film Properties | |
|---|---|---|---|
| | | Air Dried Film | Baked Film |
| A | Diethylene Glycol | Clear, flexible | Yellow, brittle. |
| B | Triethylene Glycol | do | do. |
| C | Tetraethylene Glycol | do | do. |
| D | Dipropylene Glycol | do | do. |
| E | Polypropylene Glycol Av. Mol. Wt., about 150; Sp. Gr. 1.0246. | do | do. |
| F | Polypropylene Glycol Av. Mol. Wt. about 425, Sp. Gr. 1.0104. | Hazy, oily, flexible | do. |
| G | 1, 2, 6-hexanetriol | Clear, flexible | do. |
| H | 2-methyl-2-ethyl-1, 3-propanediol | do | do. |
| I | 1,2,4-butanetriol | do | do. |
| J | 1,3-butanediol | do | do. |
| K | Urea | do | Nearly colorless, brittle. |
| L | 1,3-dimethyl urea | do | Light yellow, brittle. |
| M | 2,2-diethyl-1,3-propanediol | Sl. hazy, flexible | Light yellow, sl. hazy, flexible. |
| N | 1,5-pentanediol | Clear, flexible | Yellow, brittle. |

Example 2

A 10% solution of the polyvinyl alcohol used in Example 1 was prepared as described in that example. To each of three 50.0 g. portions of the solution there were added with stirring 1.00 g. of gylcerol, 1.00 g. of 2,2-diethyl-1,3-propanediol and 1.50 g. of 2,2-diethyl-1,3-propanediol, respectively. Films were prepared from the resulting sample solutions and the films were tested for flexibility as described in Example 1. The results are reported in Table 2.

TABLE 2

| | Plasticizer | Film Properties | |
|---|---|---|---|
| | | Air Dried Film | Baked Film |
| A | Glycerol (1.00 g.) | Clear, flexible | Yellow, brittle. |
| B | 2,2-diethyl-1,3-propanediol (1.00 g.) | Sl. hazy, flexible | Lt. Yellow, sl. hazy, flexible. |
| C | 2,2-diethyl-1,3-propanediol (1.50 g.) | Very hazy, flexible | Lt. Yellow, very hazy, flexible. |

Example 3

Films identical to those of A and B of Table 2 were cut into 3" x 0.59" pieces. One set of each was conditioned for 9 days in a room maintained at 22.2° C. (72° F.) and 50% relative humidity. A second set of each was held in a circulating air oven at 145° C. (293° F.) for one hour then conditioned at 22.2° C. (72° F.) and 50% relative humidity for 6 days. The percent elongation to break for the test films was then determined on an Instron Tensile Tester using an initial jaw separation of one inch and an elongation rate of 100%/min. The results are reported in Table 3.

TABLE 3

| Plasticizer | | Percent Elongation | |
|---|---|---|---|
| | | Air Dried Film | Baked Film |
| A | Glycerol | 724 | 21 |
| B | 2,2-diethyl-1,3-propanediol | 444 | 40 |

Example 4

To each of two flasks (A and B) was added 5.000 g. of the completely hydrolyzed polyvinyl alcohol of Example 1 which had been dried in an oven at 140° C. for 10 minutes, and to each of two other similar flasks (C and D) was added 5.000 g. of a similarly dried commercial 98% hydrolyzed grade of polyvinyl alcohol which had a viscosity of about 24 centipoises measured as a 4% solution. To each of flasks A and C was then added 1.00 g. of glycerol and to each of flasks B and D was added 1.00 g. of 2,2-diethyl-1,3-propanediol. After adding 50 ml. of water to each flask, the flasks and their contents were heated in a hot water bath while stirring the contents with glass rods. The resulting solutions were poured onto level glass plates 6.5" x 16" and spread out to cover most of the plate surface. The flasks and the stirring rods were washed with several portions of hot water and the washings transferred to the corresponding plates. The solutions were air-dried overnight and the resulting films were then stripped quantatively from the plates and weighed. The films were placed in a circulating air oven held at 140–145° C. (284–293° F.), heated for specified intervals therein and reweighed after each interval. The results are reported in Table 4.

TABLE 4

| Sample | A | B | C | D |
|---|---|---|---|---|
| G. Polyvinyl alcohol of Ex. 1 | 5.000 | 5.000 | | |
| G. Polyvinyl alcohol, 98% hydrolyzed | | | 5.000 | 5.000 |
| G. Glycerol | 1.00 | | 1.00 | |
| G. 2,2-diethyl-1,3-propanediol | | 1.00 | | 1.00 |
| Wt. of air-dried film, g | 6.30 | 6.50 | 6.29 | 6.24 |
| Wt. of film after X min. at 140–145° C.: | | | | |
| X=10 | 5.72 | 5.63 | 5.75 | 5.69 |
| X=30 | 5.52 | 5.57 | 5.48 | 5.59 |
| X=60 | 5.33 | 5.52 | 5.27 | 5.51 |
| X=120 | 5.20 | 5.48 | 5.14 | 5.45 |
| X=210 | 5.11 | 5.43 | 5.03 | 5.37 |

It will be seen from the above results that the films plasticized with 2,2-diethyl-1,3-propanediol (Samples B and D) initially lost weight faster than did the films plasticized with glycerol. However, after the initial 10 minutes of heating, the films plasticized with glycerol lost weight at by far the greater rate so that after 210 minutes of heating they (Samples A and C) contained only 0.6–2.2% of plasticizer, based on the weight of polyvinyl alcohol, compared with 7.4–8.6% for the films plasticized with 2,2-diethyl-1,3-propanediol (Samples B and D), assuming that all weight losses were losses of plasticizer. Furthermore, the latter films were still flexible after the final heating whereas those plasticized with glycerol were brittle.

The embodiments of the invention in which an exclusive property or privilege is claimed are as follows:

1. An admixture of polyvinyl alcohol and 5–30% of 2,2-diethyl-1,3-propanediol, based upon the weight of the polyvinyl alcohol.

2. The admixture of claim 1 wherein the polyvinyl alcohol is at least 97% hydrolyzed.

References Cited

UNITED STATES PATENTS

| 2,468,345 | 4/1949 | Porter | 260—33.4 |
| 2,594,498 | 4/1952 | Rohn | 260—33.4 |
| 3,121,701 | 2/1964 | Ingleby | 260—33.4 |

MORRIS LIEBMAN, *Primary Examiner.*

L. T. JACOBS, *Assistant Examiner.*